US007563336B2

(12) United States Patent
Abate

(10) Patent No.: US 7,563,336 B2
(45) Date of Patent: Jul. 21, 2009

(54) METHOD AND DEVICE FOR ULTRASOUND PROCESSING OF A MATERIAL WEB

(75) Inventor: Pietro Abate, Saint Etienne (FR)

(73) Assignee: Texti Sonics SAS, Saint Etienne (FR)

( * ) Notice: Subject to any disclaimer, the term of this patent is extended or adjusted under 35 U.S.C. 154(b) by 362 days.

(21) Appl. No.: 11/573,003

(22) PCT Filed: Aug. 8, 2005

(86) PCT No.: PCT/FR2005/002046

§ 371 (c)(1),
(2), (4) Date: Jan. 31, 2007

(87) PCT Pub. No.: WO2006/021669

PCT Pub. Date: Mar. 2, 2006

(65) Prior Publication Data

US 2009/0025853 A1    Jan. 29, 2009

(30) Foreign Application Priority Data

Aug. 10, 2004    (FR) .................................. 04 08830

(51) Int. Cl.
*B32B 37/00*    (2006.01)

(52) U.S. Cl. ...................... 156/73.1; 156/251; 156/269; 156/530; 156/580.1; 156/580.2

(58) Field of Classification Search ................ 156/73.1, 156/73.3, 88, 250, 251, 269, 510, 515, 530, 156/580.1, 580.2
See application file for complete search history.

(56) References Cited

U.S. PATENT DOCUMENTS

| 4,410,383 A |   | 10/1983 | Lipari |
| 4,623,420 A | * | 11/1986 | Hinkley ...................... 156/515 |
| 4,693,771 A | * | 9/1987 | Payet et al. ................. 156/73.3 |
| 4,711,693 A | * | 12/1987 | Holze, Jr. .................. 156/580.1 |
| 5,632,831 A | * | 5/1997 | Stull .......................... 156/73.3 |
| 6,673,178 B2 | * | 1/2004 | Ellner et al. ................ 156/73.1 |

FOREIGN PATENT DOCUMENTS

| EP | 0498364 A2 | 8/1992 |
| WO | 01/12422 A1 | 2/2001 |

* cited by examiner

*Primary Examiner*—James Sells
(74) *Attorney, Agent, or Firm*—William H. Eilberg

(57) ABSTRACT

A sonotrode and an anvil have a spacing determined by a manually adjustable mechanical device. The adjustable mechanical device includes an abutment device which maintains the distance between the sonotrode and the anvil greater than the minimum space, and which is provided with an elastic device for elastically attracting the sonotrode and the anvil to each other. Thus, it is possible to control efficiently the melting of material between the sonotrode and the anvil, for reliable welding, or for efficient cutting, or for welding along the cutting line.

13 Claims, 15 Drawing Sheets

METHOD AND DEVICE FOR ULTRASOUND PROCESSING OF A MATERIAL WEB

TECHNICAL FIELD OF THE INVENTION

The present invention concerns methods and manually adjustable devices for ultrasound processing of a strip or a web of material, in particular textile material strips or webs based on thermofusible materials.

Ultrasound is routinely used to process thermofusible materials, for example to effect cutting, welding, lamination.

A machine for this requiring manual adjustment is already known. This machine generally comprises a sonotrode, functionally associated with an ultrasound converter that applies to it a vibration at ultrasound frequency. The sonotrode is held opposite an anvil on respective opposite sides of a working area into which the material to be processed is introduced. The sonotrode is carried by a first device body part and the anvil is held by a second device body part. The first and second device body parts are articulated to each other about a transverse axis to modify the distance between the sonotrode and the anvil by relative rotation of the first and second device body parts about the transverse axis. Elastic means elastically urge rotation of the first and second device body parts in the direction of relative movement of the sonotrode and the anvil toward each other in the working area.

Such a machine requiring manual adjustment as defined hereinabove is described in the document WO 01/12422. In that machine, the transverse axis of rotation between the first and second device body parts is close to the working area so that a relative rotation about the transverse axis through a given angle produces only a small relative displacement of the sonotrode and the anvil. A thumbwheel enables adjustment of the bearing force of the elastic means and thus the force with which the material to be processed is compressed between the sonotrode and the anvil. The thumbwheel and the elastic means are placed between the first and second device body parts at the level of the sonotrode, i.e. not far from the pivot axis. This makes the relative positioning of the sonotrode and the anvil inaccurate.

In another machine requiring manual adjustment, described in the document U.S. Pat. No. 4,410,383, the transverse axis of rotation between the first and second device body parts is remote from the working area, in the middle of a lever the first end whereof carries the anvil and the second end whereof is provided with a vertical tie-rod acted on by spring providing the relative movement toward each other between the sonotrode and the anvil. A nut screwed onto the tie-rod enables adjustment of the bearing force exerted by the spring. A transverse screw engaged in a hole in the lever abuts against a fixed block to limit the rotation of the lever and therefore the relative movement toward each other between the sonotrode and the anvil, in an adjustable manner. Because of the large distance between the rotation axis and the working area, the relative positioning of the sonotrode and the anvil is inaccurate in this device.

Also, screwing the transverse screw abutting against the fixed block further in or out to adjust the limit of the relative movement toward each other between the sonotrode and the anvil significantly modifies the compression state of the spring and the elastic bearing force of the sonotrode and the anvil on the material to be welded. The adjustments of the bearing force and the relative position between the sonotrode and the anvil are interdependent, which complicates the use of the device and degrades the accuracy and the reproducibility of the adjustments.

In all cases, the ultrasonic vibrations of the sonotrode cause total or partial melting of the part of the material disposed between the sonotrode and the anvil. The result obtained depends on a number of parameters, and in particular on the speed of movement of the material between the sonotrode and the anvil, the amplitude of the ultrasonic vibrations applied to the sonotrode by the ultrasound converter, the bearing pressure of the sonotrode in the direction of the anvil, the shape of the sonotrode and the shape of the anvil.

In a first application, the anvil is a circular blade. The melting of the material by the ultrasound then produces a cut at the level of the edge of the circular blade, together with a continuous partial welding of the textile material fibers to each other on either side of the cutting line.

In a second application, the tool is a rotary roller with a textured surface. The ultrasound then produces spot welds in the region between the sonotrode and the roller and the machine includes a mechanical blade that cuts the textile material on the downstream side of the welded area.

These known devices produce a result of random quality. Usually insufficient melting is found, and therefore insufficient welding, with the risk of the textile material fraying after cutting. Conversely, excessive melting of the material is often noted, which causes plasticization of the welded areas, making them stiffer and more fragile, introducing a risk of subsequent tearing of the textile material.

The result also depends on the nature of the material to be processed. It is therefore very difficult to control the result obtained.

Furthermore, premature wear of the anvils and the sonotrodes is regularly observed, which necessitates maintenance operations to change these parts, failing which the result obtained becomes even more random.

Also known are more complex devices in which the sonotrode is moved relative to the anvil by hydraulic or pneumatic means, with sensors for monitoring the result obtained and controlling the relative displacement of the sonotrode with respect to the anvil. Such a machine is very complex and costly, however, and necessitates a source of pneumatic or hydraulic energy, which renders it inapplicable under many conditions of use, for example at the exit from circular weaving looms.

SUMMARY OF THE INVENTION

A first problem addressed by the present invention is to conceive of improvements to ultrasound processing devices with manual adjustment means with a view to guaranteeing the regularity of the result of welding or cutting a thermofusible material to be processed, in particular a textile thermofusible material to be processed, without recourse to the use of exterior pneumatic or hydraulic energy sources.

The invention aims in particular to avoid excessive melting of a thermofusible fabric, any such excessive melting degrading or even destroying the technical qualities of the fabric. It also aims to avoid insufficient melting.

Another problem addressed by the invention is eliminating the risk of a thermofusible fabric fraying on either side of the cutting line after ultrasound cutting.

Simultaneously, the invention reduces the wear of the sonotrodes and the anvils.

The invention results from the detailed analysis of the possible causes of the defects noted when using known manual adjustment devices.

When the material advances between the sonotrode and the anvil, the ultrasound vibrations cause progressive melting of the thermofusible material and thus relative penetration of the sonotrode and/or the tool into the thermofusible material. The melting is efficacious provided that the pressure exerted on the thermofusible material between the sonotrode and the anvil is high. In contrast, if this pressure disappears, there is no longer any significant transmission of ultrasound energy into the material and melting is interrupted. As a result, the sonotrode and/or the anvil penetrate(s) progressively into the thermofusible material until reaching a non-null minimum relative separation which may be rendered adjustable by abutment means for limiting convergent movement like those described in the document U.S. Pat. No. 4,410,383. If they are correctly adjusted, these means enable controlled melting to be obtained. This therefore avoids excessive melting of the thermofusible fabric, so that the technical qualities of the fabric are consequently preserved. It simultaneously avoids all risk of contact between the sonotrode and the anvil, which is liable to cause wear of the two components because of the rubbing effect of the ultrasound vibrations.

However, in such a known device, a first difficulty stems from the interdependence of the adjustment of the bearing or pressure force and the adjustment of the minimum relative separation by the transverse screw. In fact this makes the pressure exerted on the thermofusible material between the sonotrode and the anvil inaccurate, and this parameter significantly affects the quality and the regularity of the weld produced.

With the aim of solving the problem addressed by the invention, namely guaranteeing regular welding or cutting of a thermofusible material to be processed, in accordance with the invention, means are provided whereby modification of the minimum separation by the member for manual adjustment of the minimum separation does not modify the elastic bearing force produced by the elastic means and therefore does not modify the pressure exerted on the thermofusible material by the sonotrode and the anvil.

The adjustment that the operator must effect most frequently is in fact an adjustment of the minimum separation value. The determination of an appropriate adjustment as a function of the product to be processed is simplified by the fact that the minimum separation adjustment is rendered independent of the adjustment of the bearing force of the elastic means. It is also possible to adjust these two parameters, namely the elastic bearing force and the minimum separation, successively.

The adjustment of the elastic bearing force enables the device to be adapted to different natures or thicknesses of the strip or web of material to be processed: the operator may choose an elastic bearing force that is just sufficient for the sonotrode and the anvil to move toward each other until the minimum separation is reached when the material is melted in the working area. As a result, in the case of a momentary overthickness of the strip or web of material to be processed, for example, the latter can easily and without damage push the sonotrode and the anvil as far apart as necessary by compressing the elastic means.

In practice, these effects will be obtained by a device as defined in claim 1, comprising:
   a sonotrode functionally associated with an ultrasound converter and carried by a first device body part on a first side of a working area,
   an anvil held opposite the sonotrode by a second device body part on the other side of the working area,
   the first and second device body parts being displaceable relative to each other with a movement producing relative displacement of the sonotrode and of the anvil toward or away from each other,
   manually adjustable mechanical means disposed between a first connecting portion on the first device body part and a second connecting portion on the second device body part, having elastic means for spring-loading relative displacement the first and second connecting portions in the direction of relative movement toward each other of the sonotrode and the anvil in the working area,
   elastic bearing force adjustment means in the manually adjustable mechanical means for modifying the state of compression of the elastic means,
   abutment means in the manually adjustable mechanical means for limiting convergent movement which oppose relative displacement between the first and second connecting portions in the direction of relative movement toward each other of the sonotrode and the anvil short of a minimum separation whilst allowing displacement thereof in the opposite direction,
   a manual minimum separation adjustment member in the manually adjustable mechanical means for adjusting the position of the abutment for limiting convergent movement and thus adjusting the minimum separation,
   in the manually adjustable mechanical means, the abutment means for limiting convergent movement and the elastic means are in direct or indirect bearing engagement against the manual minimum separation adjustment member so that operation of the minimum separation adjustment member to modify the minimum separation does not modify the elastic bearing force produced by the elastic means.

In one advantageous embodiment, such a device according to the invention may be such that:
   the means for limiting convergent movement include an abutment in selected bearing engagement against one of the connecting portions and are carried by the manual minimum separation adjustment member,
   the manual minimum separation adjustment member is mounted to be mobile along the other connecting portion,
   the elastic means are functionally engaged between the manual minimum separation adjustment member and said one connecting portion.

In this case, in the mechanical means requiring manual adjustment, for example there can be provided that:
   the abutment means for limiting convergent movement comprise a tie-rod slidably engaged in at least one of the connecting portions on the first and second device body parts, the tie-rod having a first end head in axial bearing engagement against said one connecting portion,
   the tie-rod may include a threaded body passing through an axial hole in a threaded thumbwheel for manual adjustment of the minimum separation and receiving an adjuster nut in axial bearing engagement against said threaded adjustment thumbwheel,
   the threaded adjustment thumbwheel may be functionally screwed into a threaded bore in the other connecting portion, and
   at least one compression spring may be engaged axially around the tie-rod between the threaded adjustment thumbwheel and said one connecting portion on the opposite side to the bearing engagement of the first end head.

Such a structure is simple, reliable and robust.

Said one connecting portion is preferably the first connecting portion on the first body part and said other connecting portion is preferably the second connecting part on the second body part. As a result, during adjustment, the user operates on members carried by the fixed part of the device, which guarantees a more accurate adjustment.

The first and second device body parts are preferably rotationally articulated to each other about a transverse axis close to the working area, whereas the connecting portions on the first and second device body parts, which receive the manually adjustable mechanical means, are on the opposite side of the transverse axis to the working area and are remote from the transverse axis, in the vicinity of the distal part of the ultrasound converter. This therefore increases very significantly the accuracy of adjustment of the minimum separation, where accuracy is necessary to adapt to the generally small thicknesses of thermofusible fabrics and to guarantee more regular welding.

The compression spring or springs may advantageously be positioned at substantially the same distance from the transverse axis as the abutment means for limiting convergent movement, in order to improve further the accuracy of adjustment.

To improve the accuracy of adjustment still further, the compression spring may preferably be engaged around the tie-rod.

In a simple embodiment, the threaded adjustment thumbwheel is selectively locked in position on the corresponding connecting portion by a locknut screwed onto a threaded section.

A further improvement in the regularity of welding may be obtained by improving the member for manual adjustment of the minimum separation to take up slack continuously, by providing for:
- the threaded adjustment thumbwheel to be selectively locked in position on the corresponding connecting portion by a transverse screw screwed into a transverse threaded hole in the corresponding connecting portion and in radial bearing engagement on the interior section of the threaded adjustment thumbwheel,
- elastic means for taking up slack to be engaged between the threaded adjustment thumbwheel and the corresponding connecting portion to push the threaded adjustment thumbwheel at all times away from the other connecting portion.

The device defined hereinabove may be adapted to cut or weld continuously moving thermofusible products.

According to a first application, it can be provided that:
- the anvil may comprise a rotary roller with a transverse axis and having appropriate raised patterns on its active surface, and
- the sonotrode may have a cylindrical active surface with a transverse axis.

Such a device can produce a continuous line of spot welds around a median line.

According to another application, it can be provided that:
- the anvil may have an active surface with a circular ridge with a transverse axis and may be fixed to the second device body part, and
- the sonotrode may have a cylindrical active surface with a transverse axis.

Such a device produces a longitudinal cut or groove by ultrasound and welds the two lateral areas close to the cutting line.

In either of the above applications, the device may include a cutting blade placed on the downstream side of the working area. This results in a machine that cuts a thermofusible fabric in a median area of a welding area.

According to another aspect, the invention proposes a method for ultrasound processing of a strip or web of material by means of a device as defined hereinabove, wherein a bearing force is adjusted first by operating elastic bearing force adjustment means, after which a non-null minimum separation is adjusted by operating the manual minimum separation adjustment member, so that a separation greater than the non-null minimum separation is maintained between the sonotrode and the anvil whilst maintaining a particular elastic bearing force from the sonotrode toward the anvil against the strip or web of material if the separation is greater than the non-null minimum separation.

Preferably, in such a method:
- a continuous melted area is produced by ultrasound in the strip or web of material to be processed with a longitudinal groove that may be bordered by one or two spot weld areas,
- the strip or web of material is cut mechanically in the continuous melted area that is reduced in thickness in this way, while it is still hot.

To solve another problem of fraying, a device may be provided wherein:
- the anvil comprises a narrow fixed or rotary central part oriented longitudinally in the direction of forward movement of the strip or web of material to be processed and having a central ridge in the longitudinal plane containing the axial direction of the sonotrode,
- the anvil comprises two cylindrical rotary parts with appropriate raised patterns on either side of the central part,
- the central ridge extends slightly beyond the top generatrix of the cylindrical rotary parts in the working area,
- a fixed cutting blade is disposed on the downstream side of the working area and on the axis of the central part.

As a result, the narrow central part with the central ridge produces a longitudinal median groove that may be considered as a partial ultrasound cut, leaving a reduced thickness of material along the cutting line which is then very easy to separate by means of the fixed downstream cutting blade. Simultaneously, the narrow central part with the central ridge ensures continuous welding of the two edges of the cutting line over a width of about 1 mm, which complements the spot welding effected by the lateral cylindrical rotary parts over a width that can range from a few millimeters to about 20 to 25 millimeters his eliminates the risk of the thermofusible fabric fraying on either side of the cutting line whilst preserving the flexibility and the technical qualities of the fabric.

The raised patterns are preferably pips having a section less than or equal to 1 $mm^2$ and distributed with a pitch of about 1 mm 2 mm.

DESCRIPTION OF THE DRAWINGS

Other objects, features and advantages of the present invention will emerge from the following description of particular embodiments, given with reference to the appended figures, in which.

DESCRIPTION OF THE PREFERRED EMBODIMENTS

FIGS. 1 to 6 show, by way of illustrative but nonlimiting example, three embodiments of a device in accordance with the present invention for ultrasound processing of strips of material.

Figure 1:
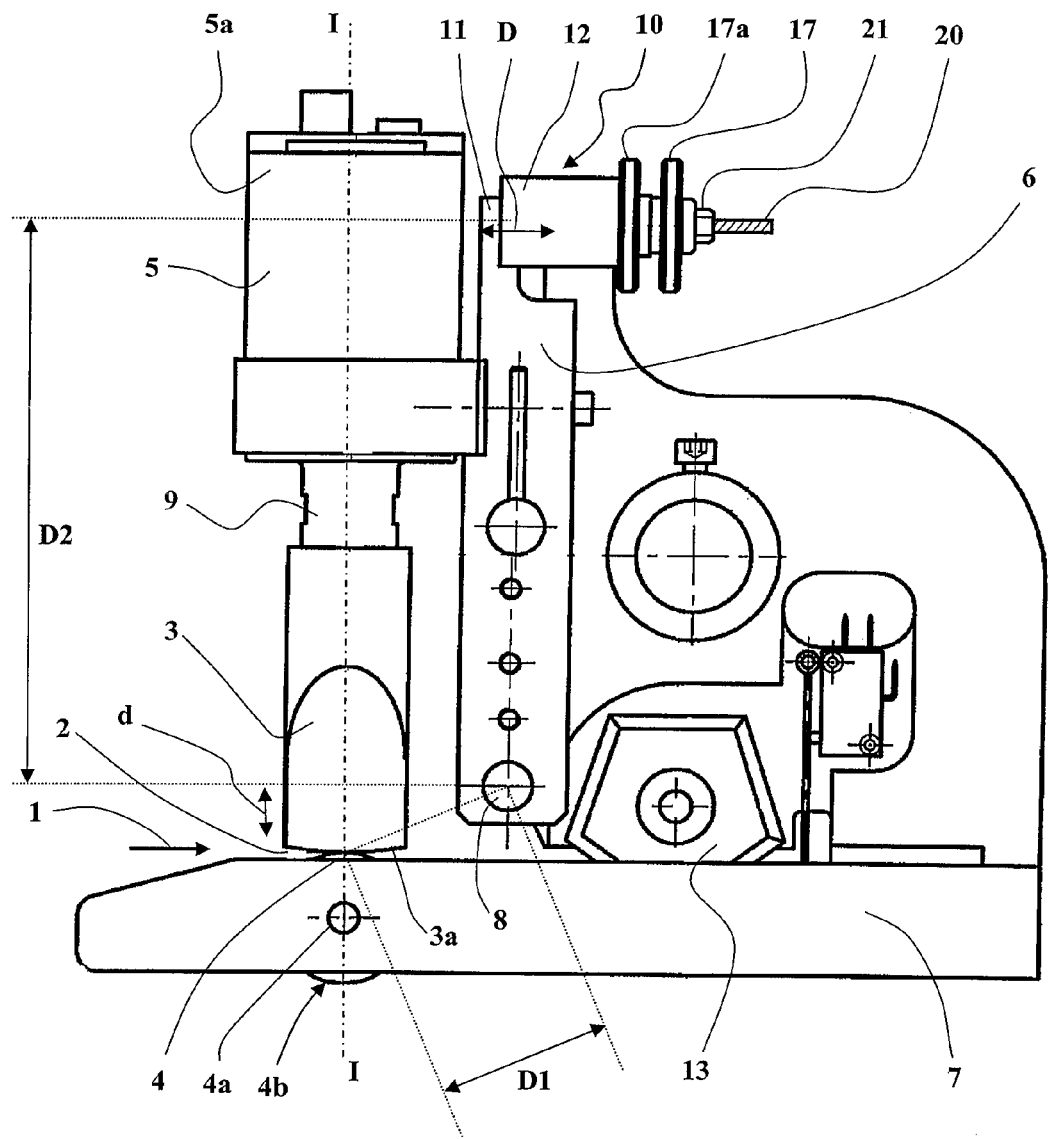
FIG. 1 is a diagrammatic side view of a device according to a first embodiment of the present invention.
Figure 2:
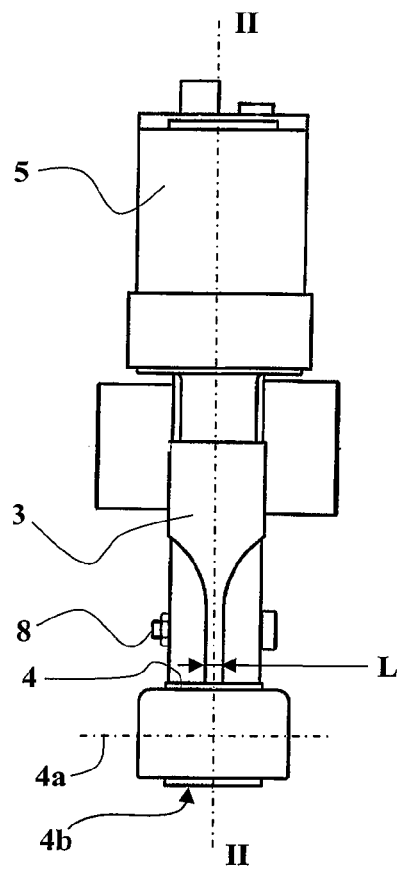
FIG. 2 is a front view of the device from FIG. 1.

The device from FIGS. 1 and 2 is a continuous ultrasound spot welding machine with integrated mechanical cutting which produces two lateral spot welds over a width of several millimeters followed by a mechanical cut in the median area between the welds.

Figure 3:
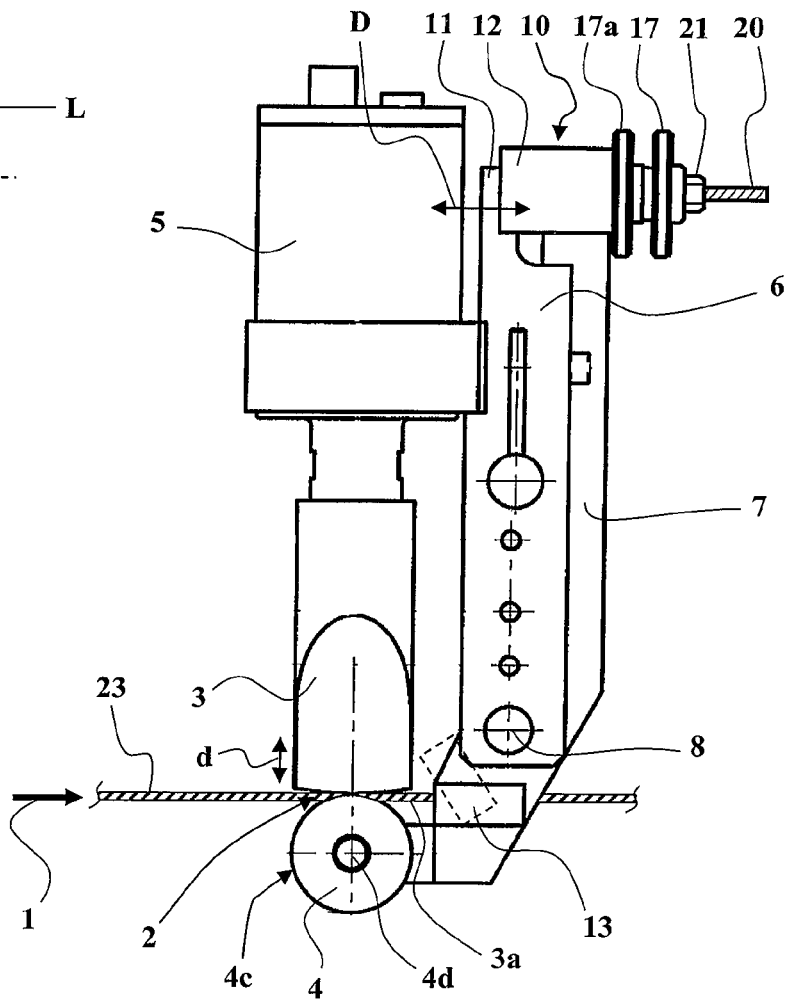
FIG. 3 is a diagrammatic side view of a device according to a second embodiment of the present invention.
Figure 4:
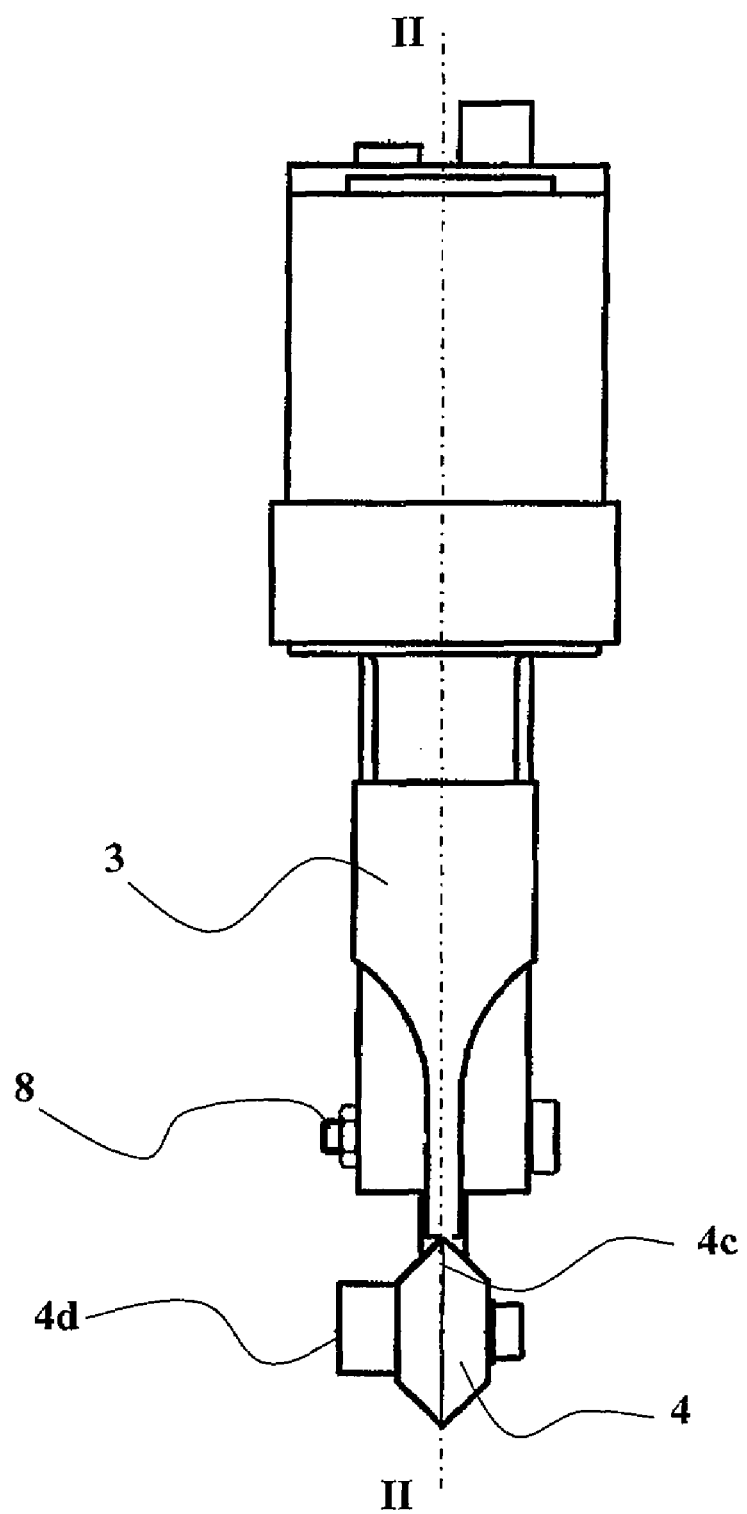
FIG. 4 is a front view of the device from FIG. 3.

The device from FIGS. 3 and 4 is a continuous ultrasound cutting and welding machine which produces a welding cut with two continuous welds each over a width of approximately 1 mm on either side of the cutting line.

Figure 5:
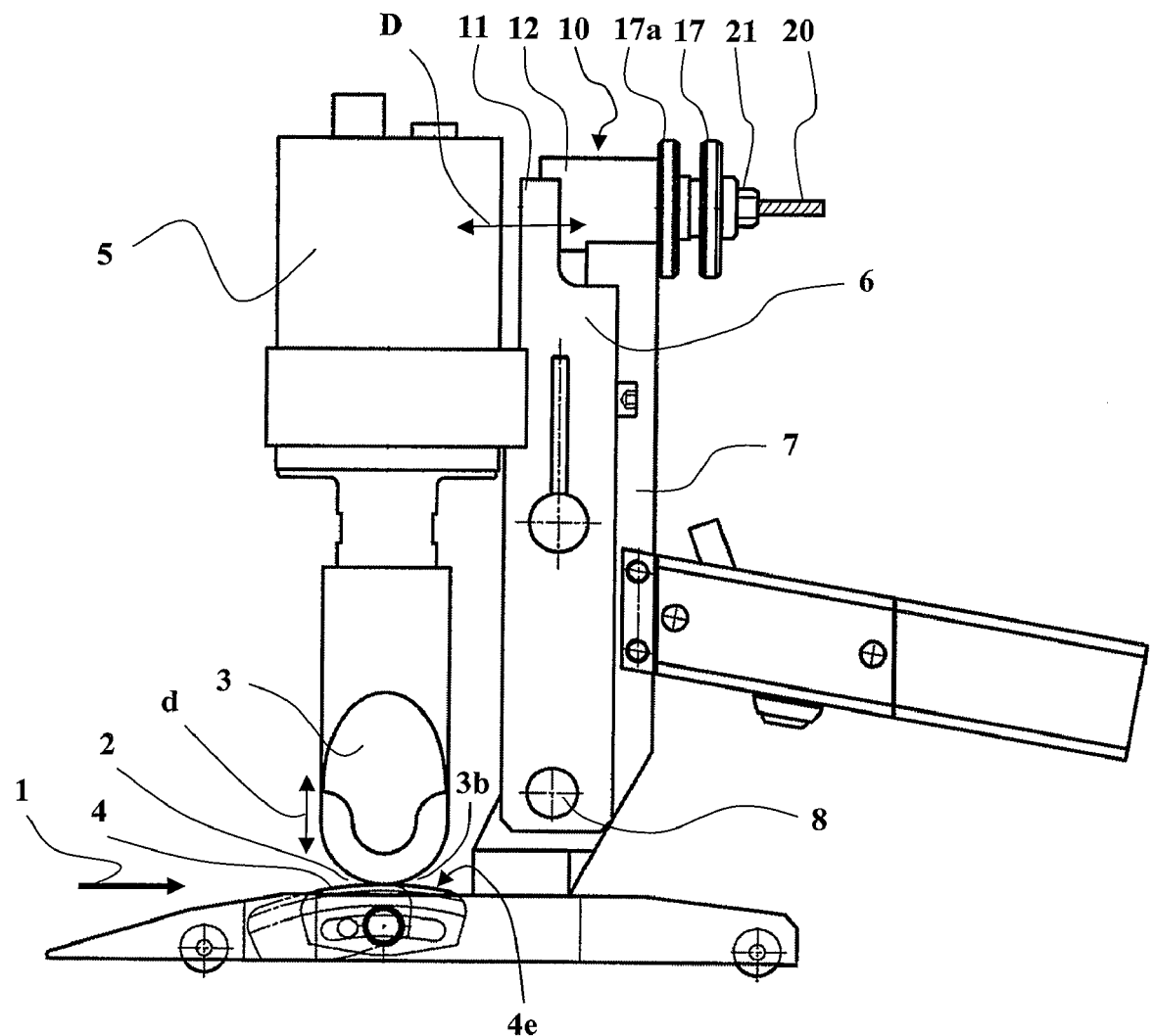
FIG. 5 is a side view of a device according to another embodiment of the invention including a tapered sonotrode.
Figure 6:
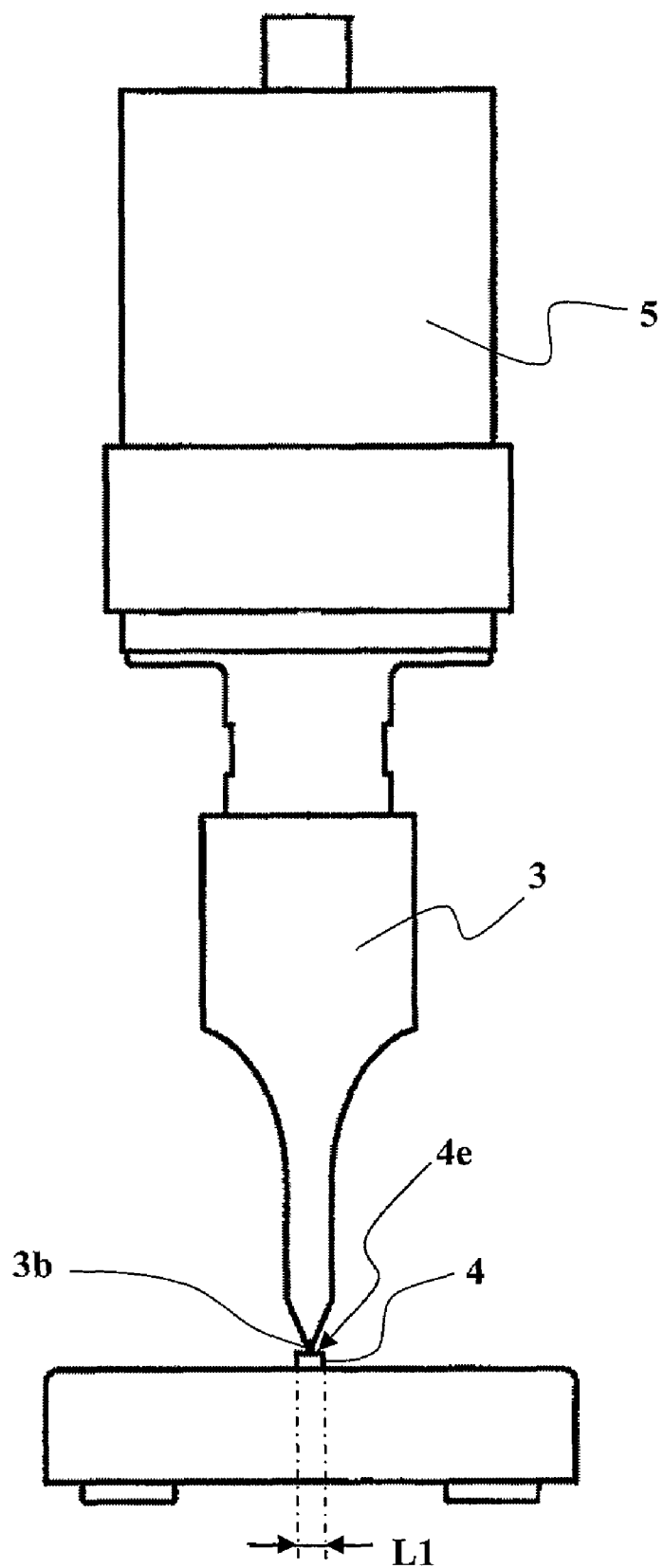
FIG. 6 is a front view of the device from FIG. 5.

The device from FIGS. 5 and 6 is another continuous ultrasound cutting and welding device.

In each of the three embodiments, most of the structural elements recur, and the corresponding elements are identified by the same numerical references.

In each case, the device is in principle intended to process a strip or web 23 of thermofusible material that is fed, in a direction of forward movement indicated by the arrow 1, toward a working area 2 situated between a sonotrode 3 and an anvil 4.

The device therefore includes the sonotrode 3, functionally associated with an ultrasound converter 5 and carried by a first device body part 6.

The device includes the anvil 4, held opposite the sonotrode 3 by a second device body part 7 on the other side of the working area 2.

The sonotrode 3, the ultrasound converter 5 and the anvil 4 are aligned in an axial direction I-I passing through the working area 2 and generally perpendicular to the forward direction 1. The ultrasound converter 5 produces axial vibrations at ultrasound frequencies in the direction I-I, which vibrations are transmitted to the sonotrode 3 by a transmitter and/or amplifier unit 9, for example a booster.

The first device body part 6 and the second device body part 7 are articulated to each other about a transverse axis 8.

The transverse axis 8 is preferably close to the working area 2 and offset laterally in the forward direction 1. D1 denotes the distance between the working area 2 and the transverse axis 8.

In this embodiment, the first device body part 6 and the second device body part 7 are movable relative to each other with a rotation movement that produces the relative displacement of the sonotrode 3 and the anvil 4 toward or away from each other in the working area 2.

Manually adjusted mechanical means 10 are disposed between a connecting portion 11 on the first device body part 6 and a connecting portion 12 on the second device body part 7. As seen in the figures, the connecting portions 11 and 12 on the first device body part 6 and the second device body part 7 are remote from the transverse axis 8, in the vicinity of the distal part 5a of the ultrasound converter 5. D2 denotes the distance between the rotation axis 8 and the connecting portions 11 and 12.

Also, as shown in the figures, the manually adjustable mechanical means 10 are on the opposite side of the transverse axis 8 to the working area 2.

As a result, a given relative displacement D between the connecting portions 11 and 12 on the first device body part 6 and the second device body part 7 causes relative pivoting of the first device body part 6 and the second device body part 7 relative to each other about the transverse axis 8 which produces a simultaneous displacement d of the sonotrode 3 relative to the anvil 4 in the axial direction I-I.

By choosing to place the transverse axis 8 in a position close to the working area 2 and to place the connecting portions 11 and 12 remote from the transverse axis 8, i.e. by choosing a distance D2 significantly greater than the distance D1, the displacement d between the sonotrode 3 and the anvil 4 will have a much smaller amplitude than the displacement D of the two connecting portions 11 and 12 on the first device body part 6 and the second device body part 7, and so the accuracy of adjustment of the distance d will be significantly increased. The person skilled in the art will be able to choose the ratio D2/D1 according to the accuracy required.

In the embodiment shown in FIGS. 1 and 2, the sonotrode 3 has a cylindrical active surface 3a with a transverse axis and with a width L (FIG. 2) that may be relatively small, for example a few millimeters, or 20 to 25 mm as a function of requirements, and the anvil 4 includes a rotary roller 4a with a transverse axis and the active surface 4b whereof includes pips or raised patterns of appropriate shape for producing, in the material to be processed, spot welds facing the active surface 3a of the sonotrode 3.

The device further comprises a fixed cutting blade 13, placed on the downstream side of the working area 2 in the forward direction 1 of movement of the material to be processed. The fixed cutting blade 13 is aligned with the median plane II-II (FIG. 2) of the sonotrode 3.

In the embodiment of FIGS. 3 and 4, the sonotrode 3 has substantially the same shape as in the embodiment of FIGS. 1 and 2, with a cylindrical active surface 3a having a transverse axis, and the anvil 4 includes an active surface with a circular edge 4c having a transverse axis 4d. In operation, the anvil 4 is fixed against rotation about its transverse axis 4d so as to split the material to be processed on its passage between the sonotrode 3 and the anvil 4.

In a variant, the embodiment of FIGS. 3 and 4 may be associated with a cutting blade 13, shown in dashed line in FIG. 3, disposed on the downstream side of the working area 2 in the median plane II-II.

In the embodiment of FIGS. 5 and 6, the anvil 4 includes a cylindrical active surface 4e having a transverse axis and of narrow width L1, and the sonotrode 3 includes a tapered semicircular active surface 3b with a transverse axis.

In the embodiments of FIGS. 1, 2, 5 and 6, the second device body part 7 is conformed to be fixed to a support such as a machine frame, thus carrying the anvil 4 in a fixed position, and the sonotrode 3 and the first device body part 6 pivot about the transverse axis 8.

In the embodiment of FIGS. 3 and 4, it is conversely the first device body part 6 that is conformed to be fixed to a support such as a machine frame, the sonotrode 3 also being fixed, whereas the anvil 4 and the second device body part 7 pivot about the transverse axis 8.

In all the embodiments of the invention, the manually adjustable mechanical means 10 comprise on the one hand elastic means, such as a spring 22 (FIG. 7), for spring-loading relative displacement of the first device body part 6 and the second device body part 7 in the direction of relative movement toward each other of the sonotrode 3 and the anvil 4 in the working area 2 in the axial direction I-I (FIG. 10) and on the other hand abutment means for limiting convergent movement, such as a tie-rod 20 (FIG. 7), which prohibit the relative displacement of the connecting portions 11 and 12 relative to each other in the direction of relative movement toward each other of the sonotrode 3 and the anvil 4 in the working area 2 short of a minimum separation E. Thus the limiter abutment means 20 maintain the axial distance between the sonotrode 3 and the anvil 4 greater than a particular minimum separation E, prohibiting relative displacement between the sonotrode 3 and the anvil 4 in the direction of convergent movement short of the minimum separation E, whilst allowing their relative displacement in the direction of movement away from each other.

As a result, a relatively thick strip or web of material 23 presented in the working area 2 in the forward direction 1 can push the sonotrode 3 and the anvil 4 elastically apart, whereas the elastic means 22 press on the strip or web of material 23 to be processed between the sonotrode 3 and the anvil 4 to transmit ultrasonic vibratory energy. This therefore causes the softening or partial melting of the material in the working area 2, but without allowing physical contact between the sonotrode 3 and the anvil 4.

In all embodiments, the manually adjustable mechanical means 10 further include a manual member for adjusting the minimum separation E, such as a threaded adjustment thumbwheel 17, which itself carries the abutment means 20 for limiting convergent relative movement and the elastic means or spring 22.

There will now be described in more detail the manually adjustable mechanical means 10 according to one possible embodiment of the present invention, as shown in FIGS. 7 to 9 and 17, during four steps of operation.

These figures show the first device body part 6, the second device body part 7 and the transverse axis 8 as well as the connecting portion 11 on the first device body part 6 and the connecting portion 12 on the second device body part 7 between which the manually adjustable mechanical means 10 are disposed.

The connecting portion 11 on the first device body part 6 includes a through-hole 14. The connecting portion 12 on the second device body part 7 has a tubular shape the interior housing 15 whereof includes a threaded bore 16 in its part away from the connecting portion 11, which threaded bore 16 has a threaded adjustment thumbwheel 17 screwed into it. The adjustment thumbwheel 17 includes an axial hole 18 in alignment with the hole 14 in the connecting portion 11. The thumbwheel 17 has a projecting external part 19 for holding it and rotating it manually about the axis III-III. A tie-rod 20 is slidably engaged in the hole 14 in the first connecting portion 11 and in the hole 18 in the adjustment thumbwheel 17, and therefore also slides in the interior housing 15 of the connecting portion 12 on the second device body part 7.

The tie-rod 20 has a first end head 20a in axial bearing engagement against the external face of the connecting portion 11 on the first device body part 6. The tie-rod 20 includes a threaded body 20b which passes freely through the axial hole 18 of the thumbwheel 17 and receives an adjuster nut 21. The adjuster nut 21 normally bears axially against the external face 19a of the thumbwheel 17. The tie-rod 20 therefore bears indirectly against the thumbwheel 17. A helicoidal compression spring 22 is engaged axially between the adjustment thumbwheel 17 and the connecting portion 11 on the first device body part 6, around the threaded body 20b of the tie-rod 20. The spring 22 therefore bears against the thumbwheel 17.

Operation is as follows: in the rest state, shown in FIG. 7, the compression spring 22 urges the two connecting portions 11 and 12 and therefore the two device body parts 6 and 7 apart, thus tending to move the sonotrode 3 (FIGS. 1 to 6) and the anvil 4 toward each other in the axial direction I-I. This convergent movement is nevertheless limited by the fact that the tie-rod 20 limits the separation of the connecting portions 11 and 12, its head 20a continuing to bear against the portion 11 and the nut 21 continuing to bear against the thumbwheel 17. The tie-rod 20, in association with the thumbwheel 17 and the nut 21, constitutes the means for limiting movement of the sonotrode 3 and the anvil 4 toward each other.

Figure 7:
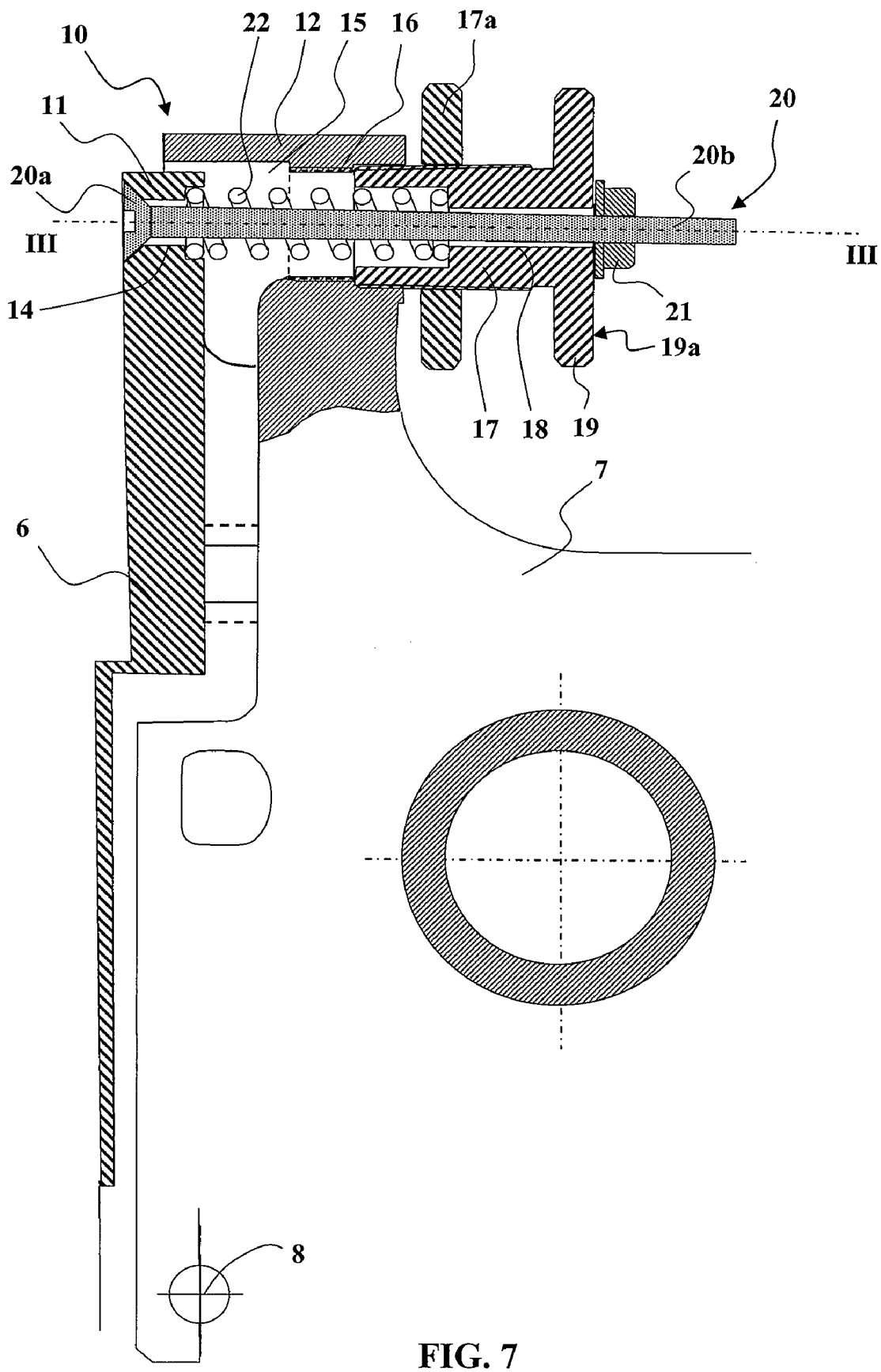
FIG. 7 is a partial side view in longitudinal section of the manually adjustable mechanical means according to one embodiment of the present invention, with the device against the abutment with a first adjustment of the minimum separation.
Figure 8:
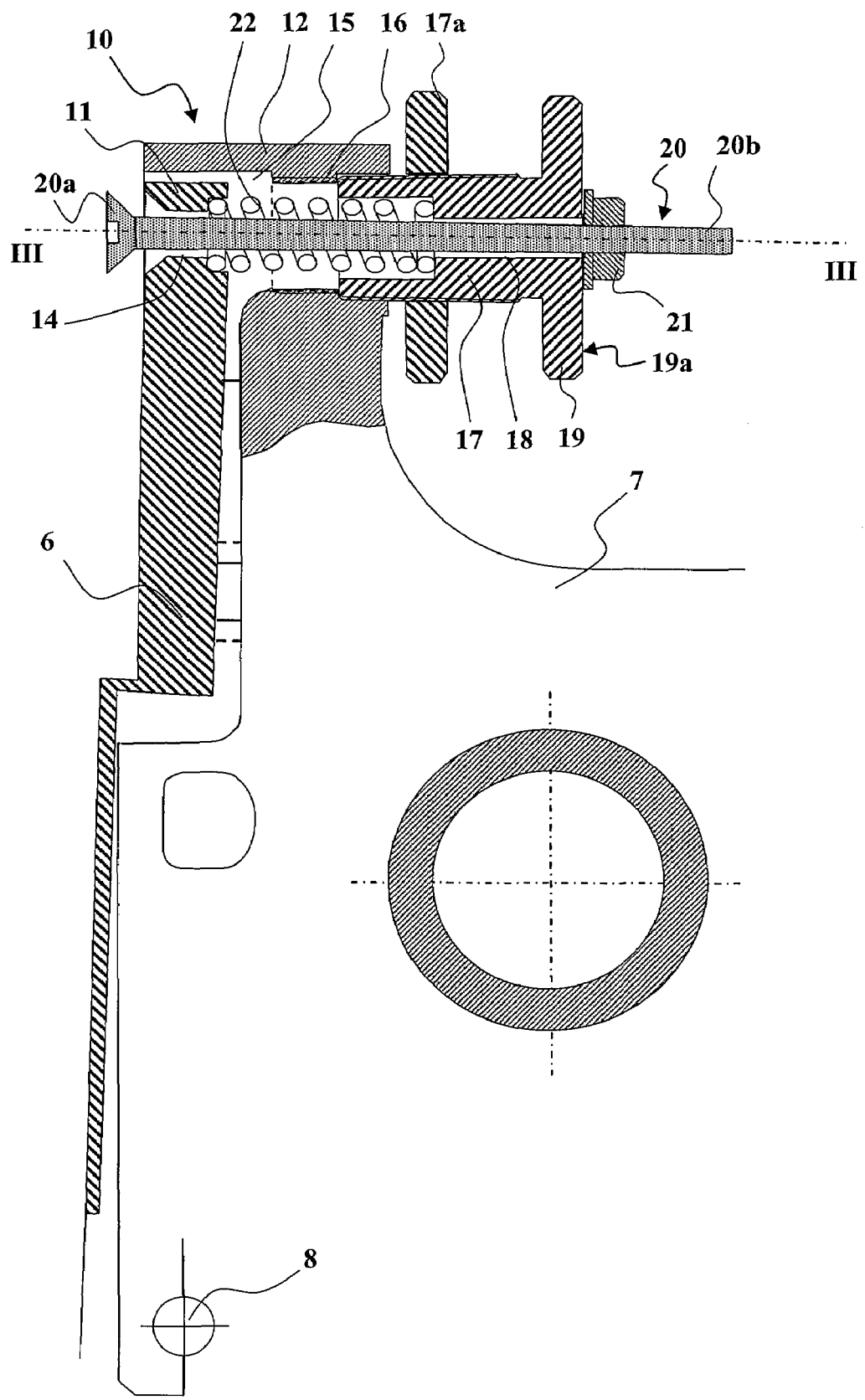
FIG. 8 is a view similar to FIG. 7, with the device remote from the abutment, with a separation greater than the minimum separation that is the effect of a force applied to the sonotrode.

Assuming a force between the sonotrode 3 and the anvil 4, for example by virtue of the engagement of a thick strip or web of material 23 between the sonotrode 3 and the anvil 4, the sonotrode 3 can move away from the anvil 4, compressing the compression spring 22, as shown in FIG. 8. In this case, the tie-rod 20 slides in the connecting portion 11 on the first device body part 6. The spring 22 determines the return force on the sonotrode 3 in the direction of the anvil 4 and therefore determines the pressure force exerted on the strip or web of material 23 to be processed. When the material to be processed is melted between the sonotrode 3 and the anvil 4, the sonotrode 3 penetrates into the material to be processed and the device may return to the position shown in FIG. 7, the tie-rod 20 then limiting penetration of the sonotrode 3 and the anvil 4 into the material to be processed.

Figure 9:
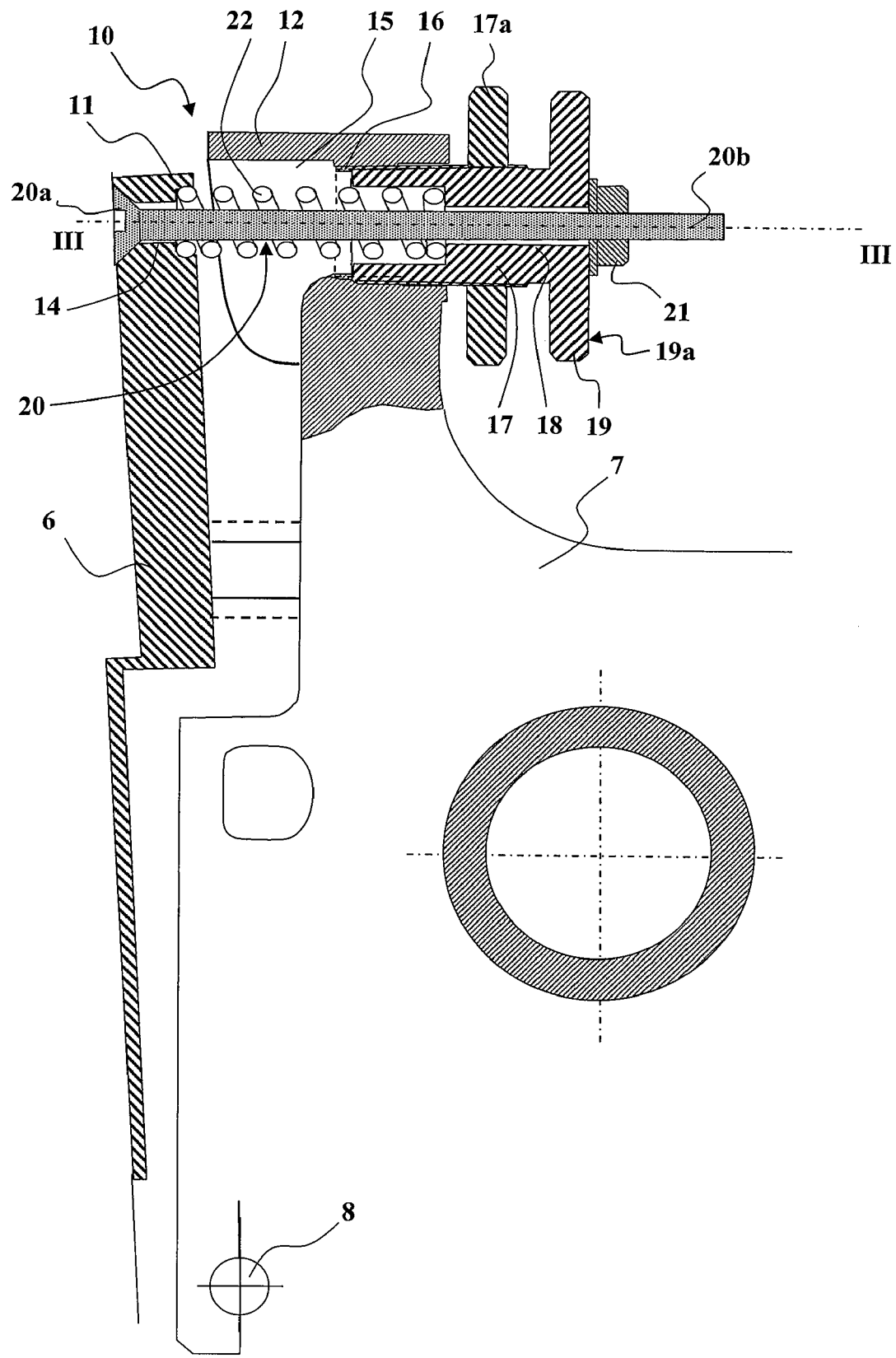
FIG. 9 is a view similar to FIG. 7, with the device against the abutment but with another, smaller adjustment of the minimum separation.

The depth of penetration of the sonotrode 3 and the anvil 4 into the strip or web of material 23 to be processed can be adjusted by screwing the thumbwheel 17 in or out, for example as shown in FIG. 9. As seen in that figure, screwing the thumbwheel 17 further in has displaced the thumbwheel 17 and the connecting portion 11 on the first device body part 6 toward the left, causing relative movement of the sonotrode 3 and the anvil 4 toward each other, and thus producing a smaller minimum separation.

As a result, the tie-rod 20 prevents relative movement of the two connecting portions 11 and 12 on the first and second device body parts 6 and 7 away from each other beyond a maximum separation value adjustable by the thumbwheel 17. Simultaneously, the spring 22 urges the two connecting portions 11 and 12 on the first device body part 6 and the second device body part 7 away from each other.

The tie-rod 20 constitutes abutment means for limiting convergent movement which limit the possible movement toward each other of the sonotrode 3 and the anvil 4. The abutment means therefore maintain the distance between the sonotrode 3 and the anvil 4 greater than a minimum separation E.

The thumbwheel 17 constitutes a manual minimum separation adjustment member by means of which the minimum separation E may be adjusted.

On considering the figures, it is seen that the mechanical manual adjustment means 10 are arranged so that the displacement of the thumbwheel 17 by turning it, which modifies the minimum separation between the sonotrode 3 and the anvil 4, does not modify the spring-loading in pivoting produced by the elastic means or spring 22, in that the spring 22 is not compressed differently during the change from FIG. 7 to FIG. 9. This effect is obtained by virtue of the fact that the abutment means 20 for limiting convergent movement and the elastic means 22 bear directly or indirectly against the manual minimum separation adjustment member or thumbwheel 17, for example when they are carried by the thumbwheel 17 as shown in the figures.

As is clear in FIGS. 7 to 9 and 17, the abutment means for limiting convergent movement consisting of the tie-rod 20 prevent relative displacement of the two connecting portions 11 and 12 on the first device body part 6 and the second device body part 7 away from each other beyond a maximum value adjustable by the thumbwheel 17. Simultaneously, the elastic means consisting of the spring 22 urge the two connecting portions 11 and 12 on the first device body part 6 and the second device body part 7 away from each other to move the sonotrode 3 and the anvil 4 toward each other.

It may nevertheless be useful to modify the force exerted by the spring 22, by providing elastic bearing force adjustment means consisting of the adjuster nut 21 screwed onto the tie-rod 20 and bearing against the thumbwheel 17.

For this purpose the adjuster nut 21 is turned, which compresses the spring 22 more or less. Reducing the compression of the spring 22 by unscrewing the adjuster nut 21 to move it from the position shown in FIG. 7 to the position shown in FIG. 17 for example reduces the return force exerted by the spring 22 for convergent movement between the sonotrode 3 and the anvil 4. Screwing in the adjuster nut 21 produces the opposite effect.

The device described hereinabove works by pressing the sonotrode 3 and the anvil 4 onto respective opposite sides of the material to be processed, as occurs in the known devices. However, according to the invention, the device works with an accurate and adjustable separation between the sonotrode 3 and the anvil 4. The minimum separation E may be determined by the user as a function of the thickness and the nature of the material to be processed. The result of melting the material can be easily controlled and becomes virtually independent of the speed of movement of the material in the forward direction 1.

This results in very regular ultrasound welding and cutting. The device avoids excessive melting of the thermofusible fabric, which for certain materials signifies the destruction of the technical qualities of the fabric.

Improved productivity and reduced wastage are obtained.

The particular arrangement of the mechanical manual adjustment means 10, in the vicinity of the distal part 5a of the converter 5, i.e. with a relatively large distance D2, combined with a relatively small distance D1, achieves highly accurate movement of the sonotrode 3 toward the anvil 4 and great accuracy of the minimum separation E. This accuracy is necessary for optimum control of the result of welding or cutting a strip or web of material that is generally thin. The accuracy obtained is equal to or less than the amplitude of the ultrasound vibrations of the sonotrode 3.

Simultaneously, in case of excess thickness of the strip or web of material 23 to be processed, the sonotrode 3 can be retracted automatically thanks to the possibility of crushing the spring 22.

The force exerted by the spring 22 can be adjusted by turning the adjuster nut 21 or by replacing the spring 22 with a spring of different stiffness.

To guarantee good accuracy and good reproducibility of the minimum separation E, it may be useful to lock selectively the position of the manual minimum separation adjustment threaded thumbwheel 17.

For this, in the embodiment of FIGS. 1 to 9 and 17, the thumbwheel 17 may be locked by a locknut 17a screwed onto the threaded section of the thumbwheel 17. The locknut 17a comes to bear axially against the end of the tubular connecting portion 12.

It will be noted that the clamping effect of the locknut 17a presses one of the faces of the threads of the thumbwheel 17 against the corresponding thread faces of the screwthread 16, which, given a certain functional clearance that is necessary, modifies very little the adjustment of the minimum separation E.

Figure 20:
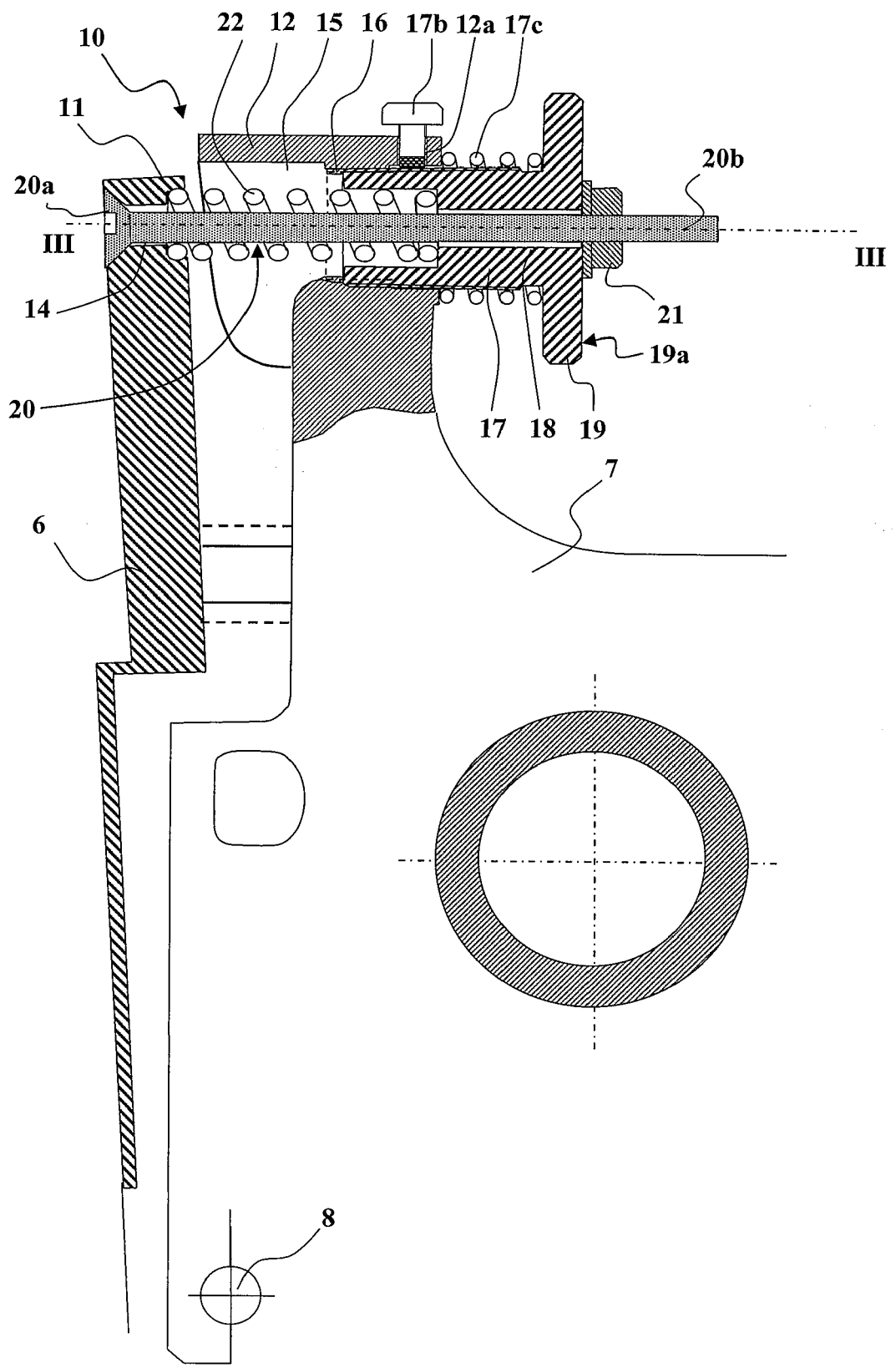
FIG. 20 is a partial side view in longitudinal section of the mechanical adjustment means according to another embodiment of the invention.

To reduce this effect, and thus to improve further the accuracy of the minimum separation E adjustment, the embodiment shown in FIG. 20 may be preferred, in which the manual minimum separation adjustment threaded thumbwheel 17 is selectively locked in position on the corresponding connecting portion 12 by a transverse screw 17b screwed into a transverse threaded hole 12a in the corresponding connection portion 12 and bearing radially on the interior section of the adjustment threaded thumbwheel 17.

Simultaneously, elastic means for taking up slack, such as a helicoidal spring 17c stronger than the spring 22, are engaged between the manual minimum separation adjustment threaded thumbwheel 17 and the corresponding connection portion 12, to push the manual minimum separation adjustment threaded thumbwheel 17 at all times away from the other connecting portion 11. The spring 17c therefore presses the threads of the thumbwheel 17 at all times against the same thread faces of the screwthread 16, whether the transverse screw 17b is tightened or not.

Figure 10:
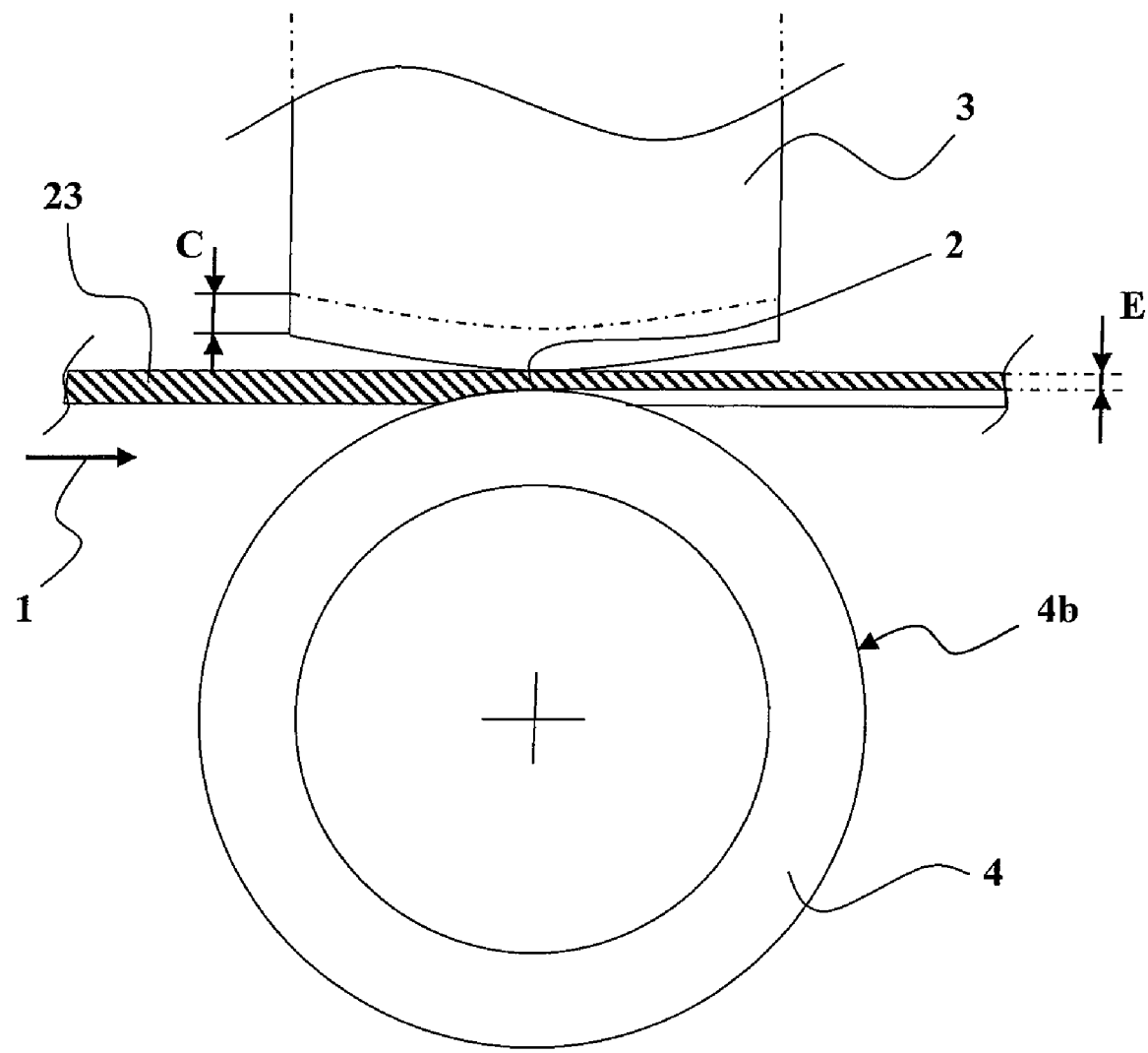
FIG. 10 is a diagrammatic side view of the working area showing the possibilities of adjustment and relative movement of a sonotrode and an anvil.

FIG. 10 shows diagrammatically the operation of the device when working. The sonotrode 3 and the anvil 4 are seen. At rest, i.e. in the absence of material to be processed, the sonotrode 3 can be moved toward and away from the anvil 4, over a travel C, by maneuvering the adjuster thumbwheel 17 (FIG. 7).

The minimum separation E, or the separation between the sonotrode 3 and the anvil 4 at rest, is chosen in this way.

By loading the sonotrode 3 with ultrasound vibrations produced by the converter 5, it is then possible to process a strip or web of thermofusible material 23 introduced into the working area 2 in the forward direction 1. Because of the effect of the ultrasound vibrations, which heat the material and tend to soften it to the melting point, the strip or web of material 23 is made thinner as it passes into the working area 2. For a longitudinal cutting of the strip or web of material 23, a small minimum separation E is chosen.

A larger minimum separation E will be chosen to effect a weld: the minimum separation E must be less than the initial thickness of the strip or web of material 23 to press on the material sufficiently to melt it in the working area 2; but the minimum separation E must not be too small, to avoid exaggerated reduction of the thickness of the strip or web of material 23 during operation.

Spot welding may be effected by providing an anvil 4 in the form of a cylindrical roller having appropriate raised patterns on its active surface 4b.

If the strip or web of material 23 is very thick, or assuming insufficient melting of the material, the sonotrode 3 may be moved away from the anvil 4 by the pivoting means and the spring 22.

In the foregoing description, the strip or web of material 23 is displaced in the forward direction 1 shown in the figures, i.e. a direction perpendicular to the transverse axis 8. The device could nevertheless be used, in accordance with the invention, to process a strip or web of material moving in the direction of forward movement parallel to the transverse axis, for example by pivoting the sonotrode 3 and/or the anvil 4 by 90° if necessary. This enables a fabric selvedge to be processed, for example.

Consider now FIGS. 11 to 14, which show a particular anvil structure according to the invention.

This particular anvil structure has the benefit of very significantly reducing the risk of fraying of a thermofusible material fabric during longitudinal cutting in the strip or web of fabric.

To obtain this effect, the anvil 4 comprises a fixed narrow central part 24 oriented longitudinally in the forward direction 1 of movement of the strip or web of material 23 to be processed, with a central ridge 24a oriented facing the sonotrode 3 in the longitudinal plane containing the axial direction I-I.

The anvil 4 further comprises two cylindrical rotary parts 25a and 25b with appropriate raised patterns on respective opposite sides of the fixed central part 24, the cylindrical rotary parts 25a and 25b being mounted to rotate freely about a transverse axis 25c.

The central ridge 24a of the fixed central part 24 projects slightly beyond the top generatrix of the two cylindrical rotary parts 25a and 25b of the working area 2, so as to be slightly closer to the sonotrode 3.

The fixed central part 24 may advantageously be adjustable in position toward and away from the sonotrode 3 by adjustment means shown diagrammatically, for example lifting screws 24b and 24c.

The adjustment means may also adjust the lateral position of the fixed central part 24, for example by means of centering screws 24d and 24e, to prevent any rubbing against the cylindrical rotary parts 25a and 25b.

In practice, the cylindrical rotary parts 25a and 25b are fastened together, mounted on the same hub and separated by a groove 25d in which the fixed central part 24 of the anvil 4 is engaged.

Figure 14:
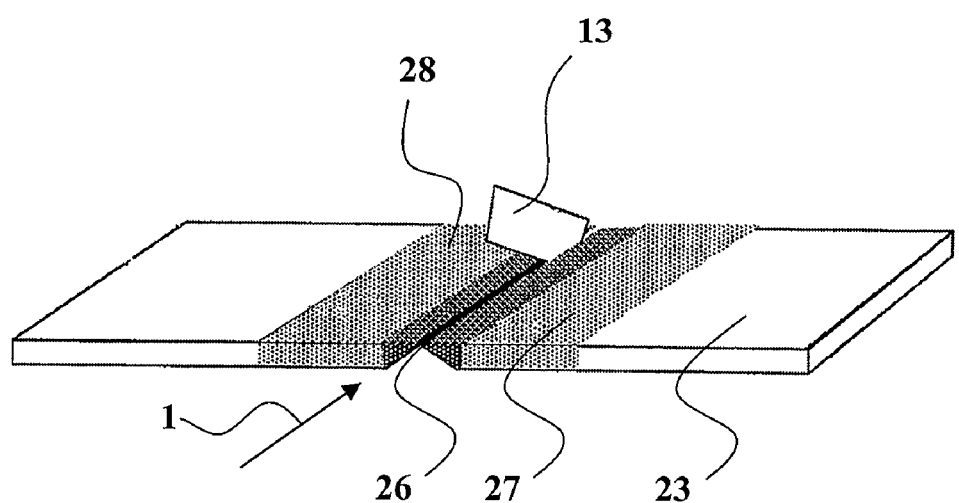
FIG. 14 shows in perspective the result obtained with an anvil from FIGS. 11 to 13 associated with a fixed blade on the downstream side.

FIG. 14 shows the result obtained by the use of this kind of anvil: a strip or web of woven thermofusible material 23 advances in the forward direction 1 and slides over the fixed central part 24 of the anvil, facing the fixed sonotrode 3, so that the fixed central part 24 penetrates into the material forming a longitudinal groove 26. The edges of the groove 26 consist of material that has been melted continuously, ensuring continuous welding of the edges of the groove 26 over a width of approximately 1 mm on each side of the cutting line.

Simultaneously, the two cylindrical rotary parts 25a and 25b have formed two lateral areas 27 and 28, over a width that may be of a few millimeters, or may be of the order of 20 to 25 mm, as a function of requirements, in which lateral areas the raised patterns of the cylindrical rotary parts 25a and 25b produce spot welds, ensuring cohesion of the thermofusible fibers of the strip or web of woven material 23 without affecting the flexibility.

Thanks to the device for limiting penetration of the sonotrode 3 and the anvil 4 into the strip or web of material 23, the groove 26 is sure to have a depth slightly less than the thickness of the strip of material 23.

This task can then easily be combined with cutting by a cutting blade 13 (FIG. 1 or 3) disposed on the downstream side of the working area 2 and on the axis of the fixed central part 24, the cutting blade 13 having only a very small thickness of material to cut in the bottom of the groove 26.

Good results may be obtained if the cylindrical rotary parts 25a and 25b have raised patterns in the form of pyramidal pips with a section less than or equal to 1 mm$^2$ and distributed with a pitch of about 1 mm to 2 mm.

Figure 18:
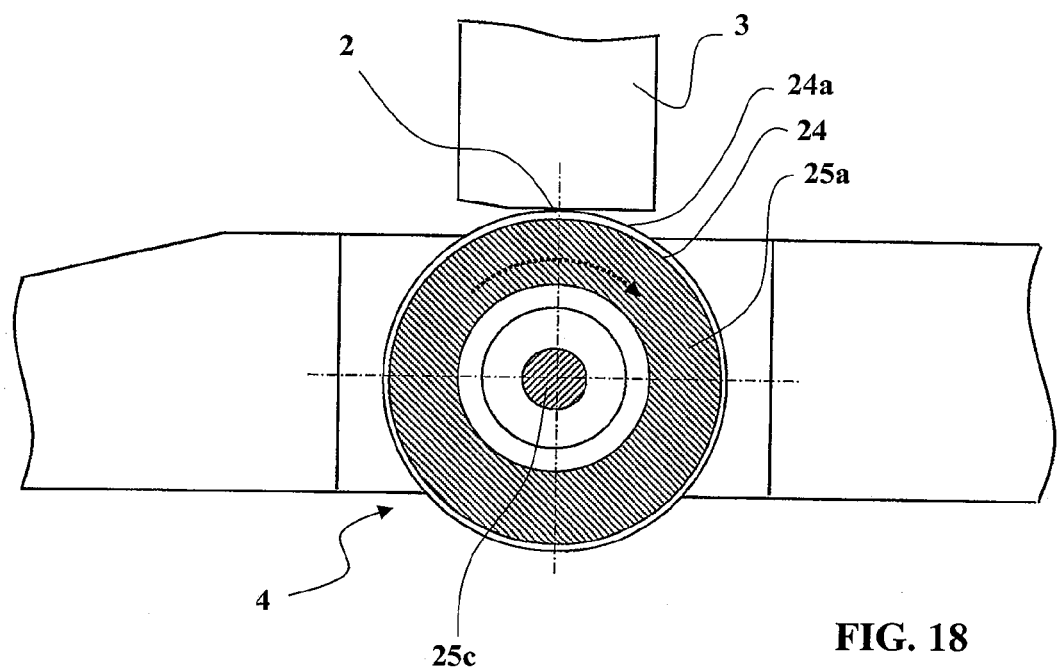
FIG. 18 is a side view of an anvil according to a variant of the FIG. 11 embodiment for partial ultrasound cutting and multiple ultrasound spot welding.
Figure 19:
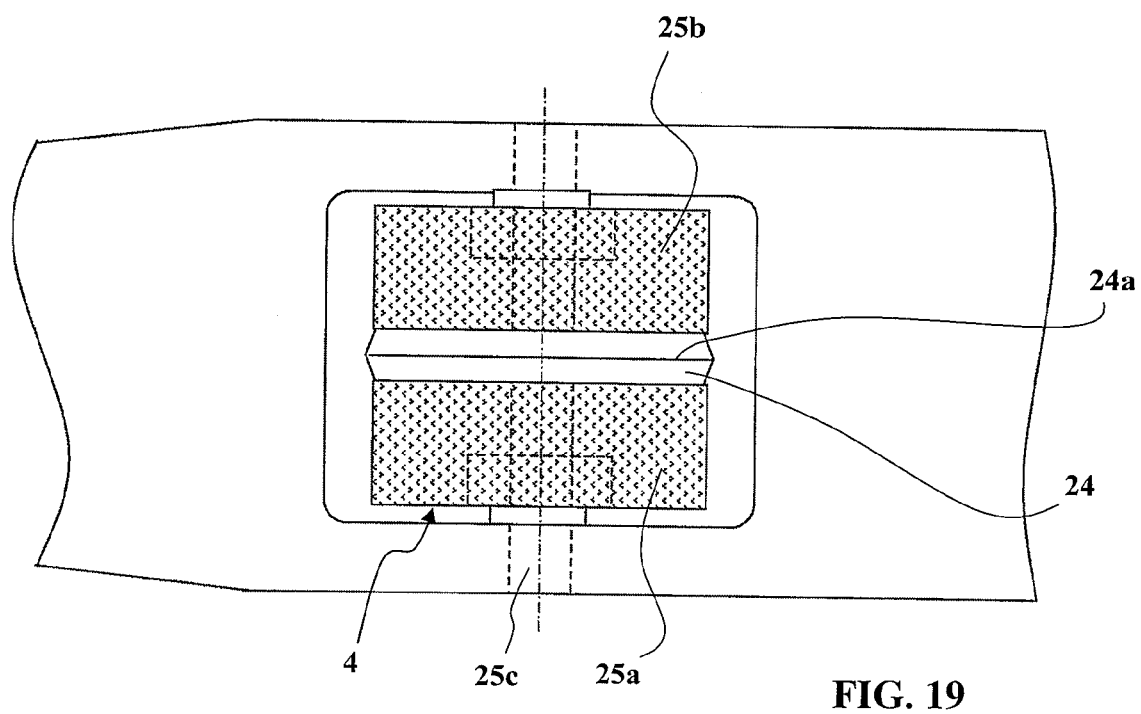
FIG. 19 is a top view of the anvil from FIG. 18.

FIGS. 18 and 19 show a variant anvil 4 according to the invention for reducing the risk of fraying of a thermofusible material fabric. There are two cylindrical rotary parts 25a and 25b with appropriate raised patterns mounted to rotate freely about a transverse axis 25c, as in FIGS. 11 to 13. The difference lies in the central part 24, which is also a rotary part, fastened to the cylindrical rotary parts 25a and 25b. The central part 24 includes a circular central ridge 24a in the longitudinal plane containing the axial direction I-I. The central ridge 24a project slightly beyond the top generatrix of the cylindrical rotary parts 25a and 25b in the working area 2. FIG. 14 shows in a similar way the result obtained by the use of this kind of anvil.

It will be understood that the invention therefore provides a method for ultrasound processing of a strip or web of thermofusible material by means of a device defined hereinabove in which there are effected successively the adjustment of the bearing force and then the adjustment of the non-null minimum separation E, so as to maintain between the sonotrode 3 and the anvil 4 a separation greater than the non-null minimum separation E whilst maintaining a particular elastic bearing force of the sonotrode 3 and the anvil 4 on the strip or web of material 23 if the separation is greater than the non-null minimum separation E.

Cutting may advantageously be effected in two successive, closely spaced steps:
  there is produced by ultrasound, in the strip or web of material 23, a continuous fused area, i.e. the area of the groove 26, bordered by two areas of spot welds, i.e. the two lateral areas 27 and 28,
  the strip or web of material 23 is cut mechanically in the fused area produced in this way i.e. in the bottom of the groove 26, this area still being hot, which further facilitates cutting.

Figure 11:
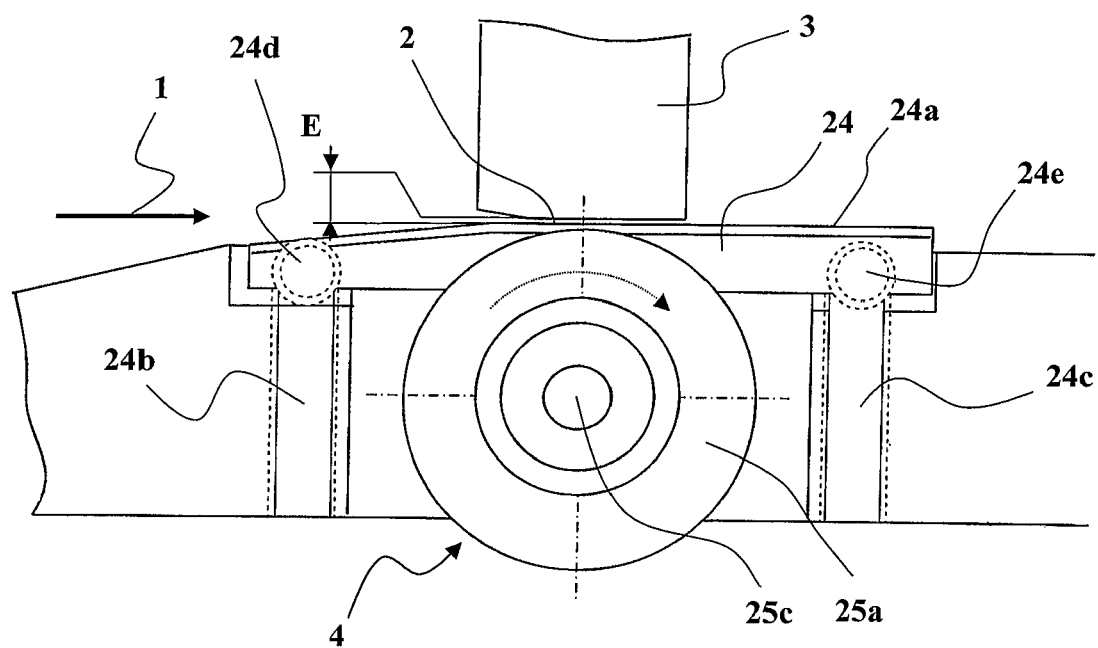
FIG. 11 is a diagrammatic side view of a particular anvil structure according to one embodiment of the invention adapted for partial ultrasound cutting and multiple ultrasound spot welding.
Figure 12:
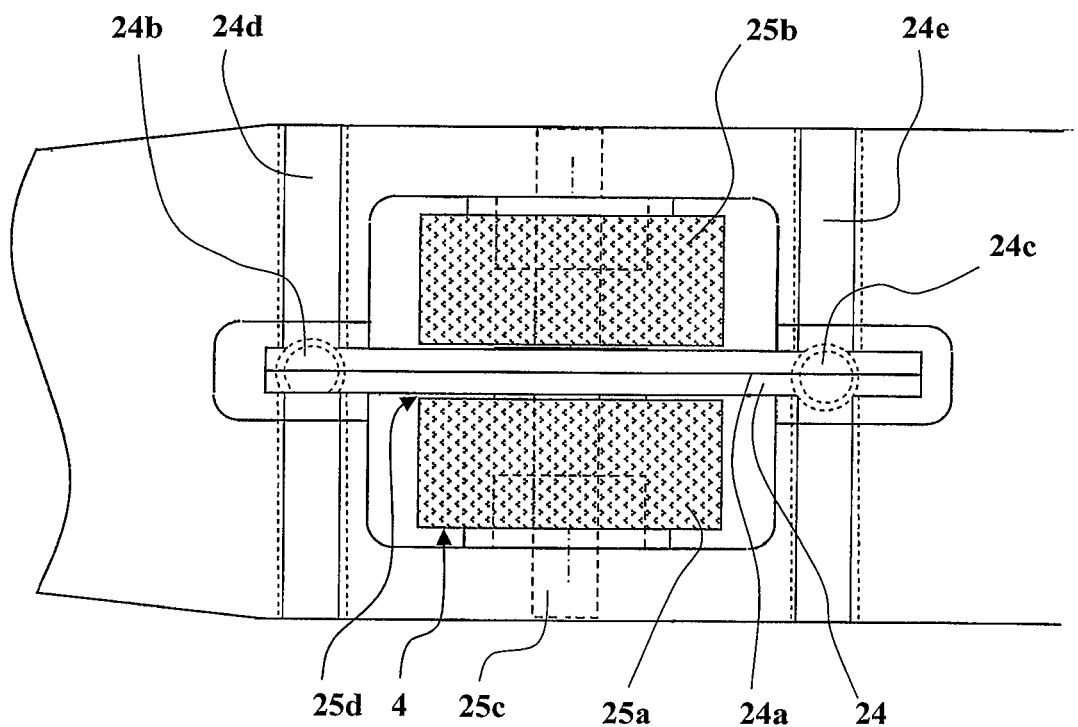
FIG. 12 is a top view of the anvil from FIG. 11.
Figure 13:
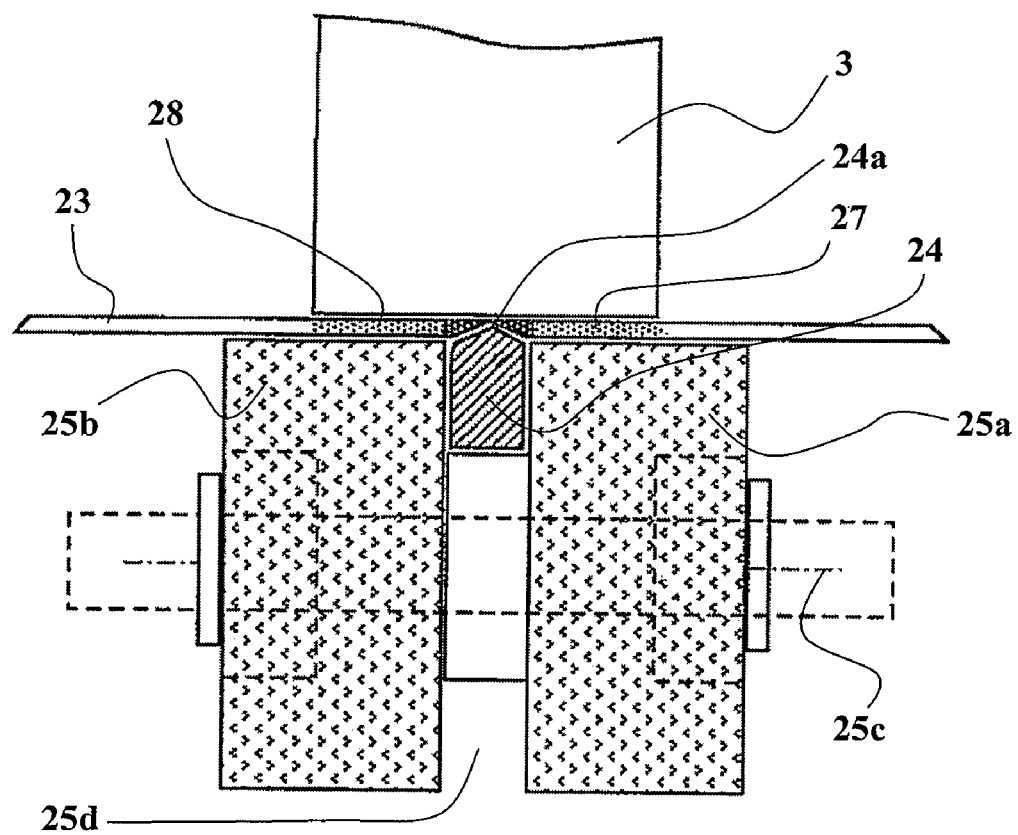
FIG. 13 is a front view in partial cross-section of the anvil from FIG. 11 with the sonotrode and the material to be processed.

The anvil 4 according to FIGS. 11 to 13 may be used in a device as shown in FIGS. 1 and 2 in particular.

It may in particular prove advantageous to use this anvil with mechanical manual adjustment means 10 that effectively limit the depth of penetration of the sonotrode 3 and of the anvil 4 into the material to be processed, leaving the fixed cutting blade 13 to finish the cut.

However, the anvil 4 according to FIGS. 11 to 13 may find useful applications, independently of the use of other mechanical manual adjustment means 10, and thereby constitute an independent invention.

Figure 15:
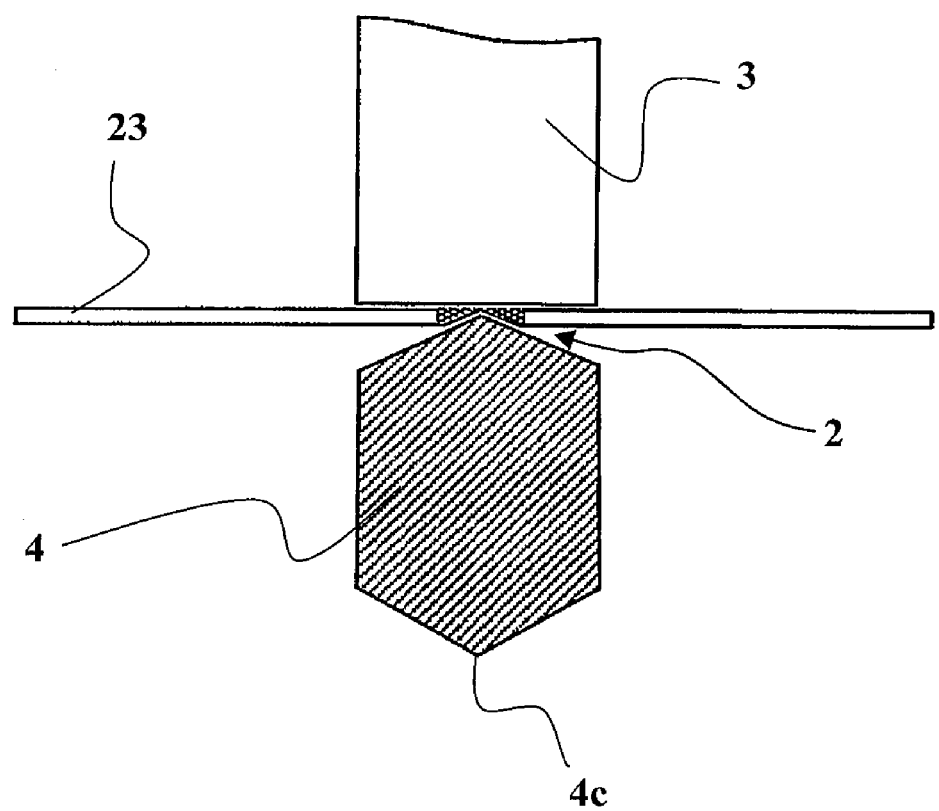
FIG. 15 is a front view in cross-section of an anvil according to the embodiment of FIGS. 3 and 4 with the sonotrode and the material to be processed.
Figure 16:
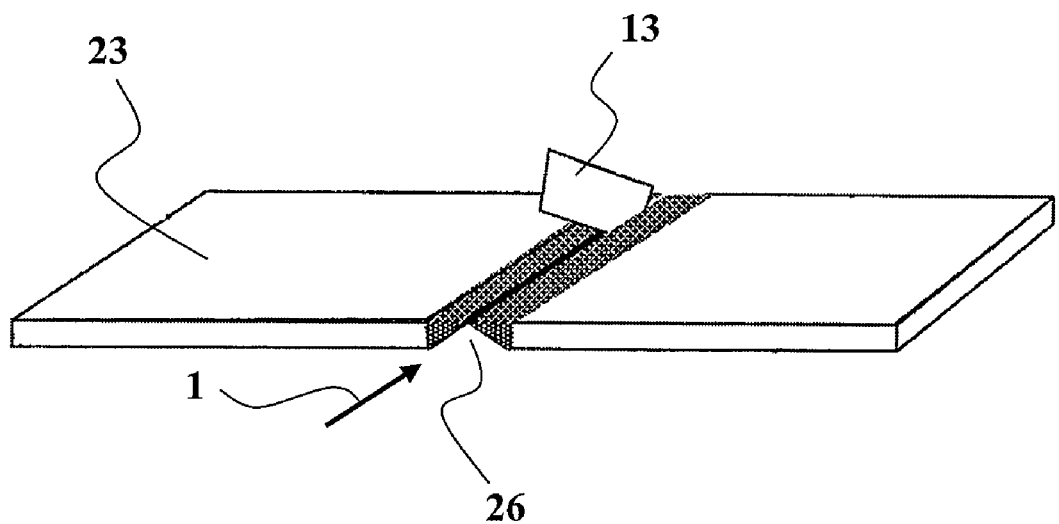
FIG. 16 shows in perspective the result obtained with an anvil from FIG. 15 associated with a fixed blade on the downstream side.
Figure 17:
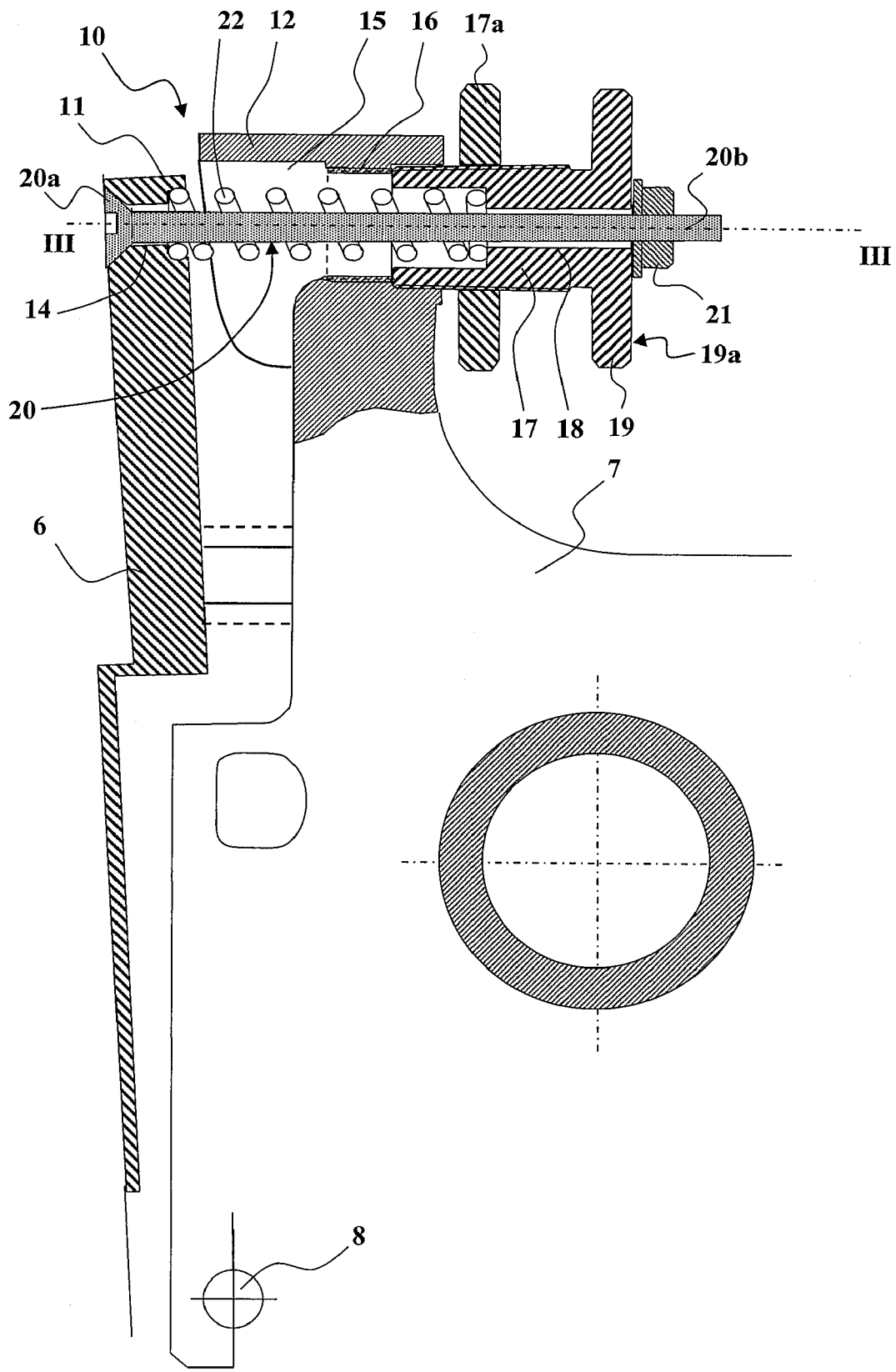
FIG. 17 is a view similar to FIG. 7, with the device against the abutment but with a different elastic bearing force adjustment.

FIGS. 15 and 16 show a variant of the method according to the invention. In this case, a device as represented in FIGS. 3 and 4 is used, for example. FIG. 15 is a partial front view to a larger scale, in the vicinity of the working area 2, in cross section. The anvil 4 with the circular ridge 4c is seen.

FIG. 16 shows the result obtained by the use of this kind of anvil 4: the strip or web of thermofusible material 23 advances in the forward direction 1 and slides over the circular ridge 4c which forms the groove 26 the edges whereof consist of molten material, ensuring a continuous weld. A fixed cutting blade 13 disposed on the downstream side of the working area 2 completes the cutting of the strip or web of material 23 in the bottom of the groove 26.

In all the embodiments described hereinabove including an anvil 4 having at least one element rotating about the transverse axis 4a, it may be advantageous to mount the rotary element on bearing. Such mounting facilitates the passage of the strip or web of material 23 through improved rolling, and thus contributes to an improved quality of the weld both in terms of geometry and in terms of intensity.

In fact, the rolling encouraged by the bearings prevents loading of the welding area in traction, which area is weakened during the ultrasound heating, thus guaranteeing less geometrical deformation of the imprints left by the pips or raised patterns of the anvil 4 in the material to be processed. Furthermore, this rolling then being more fluid and less subject to jerks, the fabric may be pulled more regularly, thus preventing a particular area of the weld, by remaining slightly too long under the sonotrode, being subjected to overheating, affecting the quality and/or uniformity of the weld.

The present invention is not limited to the embodiments that have been described explicitly, but includes diverse variants and generalizations thereof falling within the scope of the following claims.

The invention claimed is:

1. Device for ultrasound processing of a strip or web of material, comprising:
   a sonotrode functionally associated with an ultrasound converter and carried by a first device body part on a first side of a working area,
   an anvil held opposite the sonotrode by a second device body part on the other side of the working area,
   the first device body part and the second device body part being displaceable relative to each other with a movement producing relative displacement of the sonotrode and of the anvil toward or away from each other,
   manually adjustable mechanical means disposed between a first connecting portion on the first device body part and a second connecting portion on the second device body part and having elastic means for spring-loading relative displacement the first connecting portion and the second connecting portion in the direction of relative movement toward each other of the sonotrode and the anvil in the working area,
   elastic bearing force adjustment means in the manually adjustable mechanical means for modifying the state of compression of the elastic means,
   abutment means in the manually adjustable mechanical means for limiting convergent movement which oppose relative displacement between the first connecting portion and the second connecting portion in the direction of relative movement toward each other of the sonotrode and the anvil short of a minimum separation whilst allowing displacement thereof in the opposite direction,
   a manual minimum separation adjustment member in the manually adjustable mechanical means for adjusting the position of the abutment for limiting convergent movement and thus adjusting the minimum separation,
   wherein, in the manually adjustable mechanical means, the abutment means for limiting convergent movement and the elastic means are in direct or indirect bearing engagement against the manual minimum separation adjustment member so that operation of the minimum separation adjustment member to modify the minimum separation does not modify the elastic bearing force produced by the elastic means.

2. Device according to claim 1, wherein:
   the means for limiting convergent movement include an abutment in selected bearing engagement against one of the connecting portions and are carried by the manual minimum separation adjustment member,
   the manual minimum separation adjustment member is mounted to be mobile along the other connecting portion, and
   the elastic means are functionally engaged between the manual minimum separation adjustment member and said one connecting portion.

3. Device according to claim 2, wherein, in the manually adjustable mechanical means:
   the abutment means for limiting convergent movement comprise a tie-rod slidably engaged in at least one of the connecting portions on the first device body part and the second device body part, the tie-rod having a first end head in axial bearing engagement against said one connecting portion,
   the tie-rod includes a threaded body passing through an axial hole in a threaded thumbwheel for manual adjustment of the minimum separation and receiving an adjuster nut in axial bearing engagement against said threaded adjustment thumbwheel,
   the threaded adjustment thumbwheel is functionally screwed into a threaded bore in the other connecting portion,
   at least one compression spring is engaged axially around the tie-rod between the threaded adjustment thumbwheel and said one connecting portion on the opposite side to the bearing engagement of the first end head.

4. Device according to claim 3, wherein said one connecting portion is the first connecting portion on the first body part and said other connecting portion is the second connecting part on the second body part.

5. Device according to claim 1, wherein the first device body part and the second device body part are rotationally articulated to each other about a transverse axis close to the working area, whereas the connecting portions on the first device body part and the second device body part, which receive the manually adjustable mechanical means, are on the opposite side of the transverse axis to the working area and are remote from the transverse axis, in the vicinity of the distal part of the ultrasound converter.

6. Device according to claim 3, wherein the threaded adjustment thumbwheel is selectively locked in position on the corresponding connecting portion by a locknut screwed onto a threaded section.

7. Device according to claim 3, wherein:
   the threaded adjustment thumbwheel is selectively locked in position on the corresponding connecting portion by a transverse screw screwed into a transverse threaded hole in the corresponding connecting portion and in radial bearing engagement on the interior section of the threaded adjustment thumbwheel, and
   elastic means for taking up slack are engaged between the threaded adjustment thumbwheel and the corresponding connecting portion to push the threaded adjustment thumbwheel at all times away from the other connecting portion.

8. Device according to claim 1, adapted to cut or weld continuously moving thermofusible products.

9. Device according to claim 1, wherein:

the anvil comprises a rotary roller with a transverse axis, having appropriate raised patterns on its active surface, and the sonotrode has a cylindrical active surface with a transverse axis.

10. Device according to claim 1, wherein:

the anvil has an active surface with a circular ridge with a transverse axis and is fixed to the second device body part, and the sonotrode has a cylindrical active surface with a transverse axis.

11. Device according to claim 9, wherein it further includes a cutting blade placed on the downstream side of the working area.

12. Method for ultrasound processing of a strip or web of material by means of a device according to claim 1, wherein a bearing force is adjusted first by operating elastic bearing force adjustment means, after which a non-null minimum separation is adjusted by operating the manual minimum separation adjustment member, so that a separation greater than the non-null minimum separation is maintained between the sonotrode and the anvil whilst maintaining a particular elastic bearing force from the sonotrode toward the anvil against the strip or web of material if the separation is greater than the non-null minimum separation.

13. Method according to claim 12, wherein:

a continuous melted area is produced by ultrasound in the strip or web of material to be processed with a longitudinal groove that may be bordered by one or two spot weld areas or not, and the strip or web of material is cut mechanically in the continuous melted area that is reduced in thickness in this way, while it is still hot.

* * * * *